(No Model.)
J. T. JONES.
TWINE HOLDER.
No. 435,425.  Patented Sept. 2, 1890.
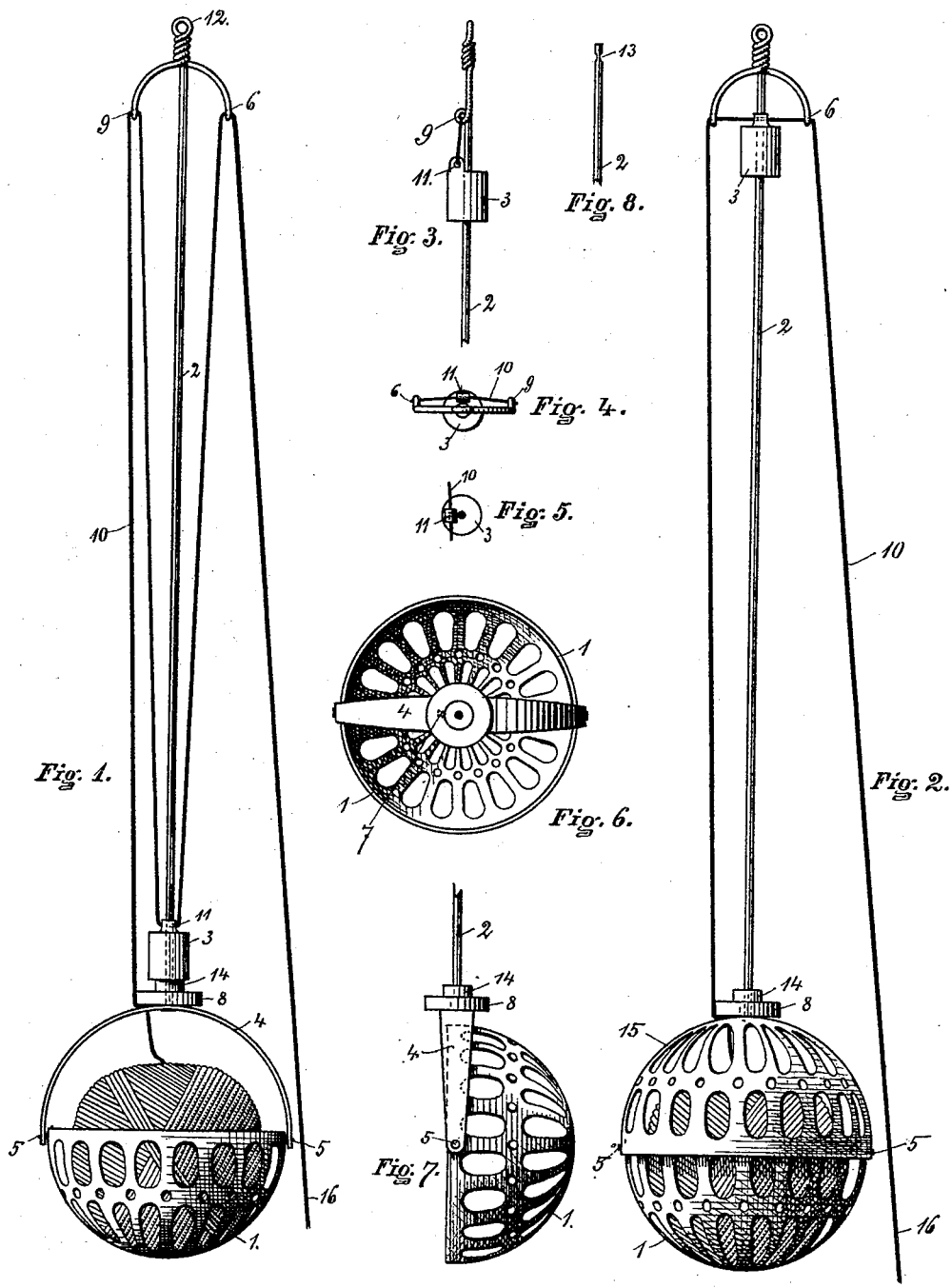
WITNESSES.
Rich. George.
M. E. Robinson
INVENTOR.
J. Thomas Jones
By Risley & Perry
Attys

UNITED STATES PATENT OFFICE.

JOHN THOMAS JONES, OF UTICA, NEW YORK.

TWINE-HOLDER.

SPECIFICATION forming part of Letters Patent No. 435,425, dated September 2, 1890.

Application filed January 20, 1890. Serial No. 337,526. (No model.)

*To all whom it may concern:*

Be it known that I, JOHN THOMAS JONES, of the city of Utica, in the county of Oneida and State of New York, have invented certain new and useful Improvements in Twine-Holders; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

My invention relates to improvements in twine-holders.

In the drawings which accompany and form a part of this specification, and in which similar letters and numerals of reference refer to like parts in the several figures, Figure 1 shows in elevation my twine-holder ready for use. Fig. 2 shows in elevation the twine-holder having a modified form of globe or basket for the ball of twine and the position the movable parts assume when twine is being drawn from the ball and holder. Fig. 3 shows a portion of the upper end of the device and weight on a quarter turn from the same parts in Fig. 1. Fig. 4 is a top view of Fig. 3. Fig. 5 is a top view of the weight. Fig. 6 shows a top view of the basket and bail. Fig. 7 shows in elevation the receptacle for the ball turned on its pivots so as to permit the introduction of the ball of twine. Fig. 8 shows details of construction.

Referring to the reference numerals and letters marked on the drawings, 1 indicates a basket or receptacle for the ball of twine.

2 is a rod by which the receptacle is suspended, and which also acts as a guide for the sliding take-up weight 3. A bail 4 is provided, which secures the receptacle to the rod, the receptacle being pivoted in the bail at 5 5, so that it will swing into the position shown in Fig. 7 to permit the introduction of the ball of twine into the receptacle. The twine 10 passes through a hole 7 (shown in dotted lines in Fig. 6) near the point at which the bail is secured to the rod 2 and beneath the tension-weight 8, which weight 8 is mounted loosely on the rod 2. The twine 10 passes from the opening 7 to and around the edge of the tension-weight 8, and thence to eye 9 at the top of the device, thence to an eye 11 in the take-up weight 3, thence to an eye 6 at the top, from which eye 6 the twine is suspended. An elastic cushion 14, of rubber or other suitable material, is provided at the lower end of rod 2, on which the weight 3 strikes and rests when in its lowest position. An eye or ring 12 may be provided, by which the device may be suspended. I prefer to construct the arms which carry the eyes 6 and 9 and the ring 12 of wire and secure them to the rod 2 by twisting into a notch or recess 13, Fig. 8, in the rod.

In Fig. 2 is shown a modified form of construction of the receptacle for the ball of twine, in which, in lieu of the bail 4, I provide a hemisphere of larger diameter than the lower part of the receptacle, the lower part being pivoted at 5 5 therein.

In use the device is preferably suspended by eye 12, and being threaded, as described, the twine is drawn out by the end 16. As the twine is drawn out the weight 3 ascends from the position shown in Fig. 1 to that shown in Fig. 2, the friction on the twine caused by tension-weight 8 being sufficient to cause the weight 3 to rise before the twine will run from the ball A. When the take-up weight 3 has risen to its highest point, the twine then runs from the ball until the desired quantity has been withdrawn. Then upon freeing the end 16 the weight 3 will descend, drawing the free end up out of the way.

What I claim as new, and desire to secure by Letters Patent, is—

1. The combination, in a twine-holder, of a receptacle for containing the ball, a bail in which the receptacle is pivoted, a vertical rod secured to the bail, two eyes at each side of the upper end of the rod, a take-up weight running on the rod having a twine-eye, the opening in the bail for the passage of the twine, and the tension-weight over the opening.

2. The combination, in a twine-holder, of the twine-holding receptacle, the single guide and suspension rod 2, the projecting arms secured to the upper end of rod 2, carrying eyes 6 and 9 at either side and out of line with the rod 2, the take-up weight 3, sliding on rod 2, twine-eye 11 at the side of rod 2, the opening 7 in the receptacle for the passage of the twine, and the tension-weight 8, mounted on rod 2 and adapted to cover opening 7, substantially as set forth.

3. The combination, in a twine-holder, of the receptacle, the vertical guide and suspension rod 2, the eyes 6 and 9, the take-up weight 3, having a twine-eye, the opening in the receptacle for the twine, the tension-weight on rod 2 covering the opening, and the cushion, substantially as set forth.

4. The combination, in a twine-holder, of the twine-holding receptacle, the single guide, rod 2 by which it is suspended, the projecting arms carrying eyes 6 and 9 at either side of the rod 2 and secured thereto, the take-up weight 3, running on rod 2 and having eye 11, the opening 7 in the receptacle for the passage of the twine, and the tension-weight, substantially as set forth.

In witness whereof I have affixed my signature in presence of two witnesses.

J. THOMAS JONES.

Witnesses:
 MILTON E. ROBINSON,
 JOSIAH PERRY.